United States Patent Office 3,202,685
Patented Aug. 24, 1965

3,202,685
3,3'-STEROID AZINES
Andrew John Manson, North Greenbush, N.Y., assignor to Sterling Drug Inc., New York, N.Y., a corporation of Delaware
No Drawing. Filed Aug. 30, 1963, Ser. No. 305,867
2 Claims. (Cl. 260—397.5)

This invention relates to nitrogen containing steroids, and in particular is concerned with 3,3'-steroid azines having the following general formula:

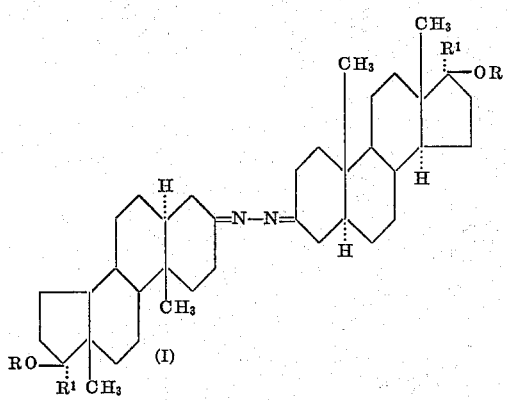

wherein R stands for hydrogen or a lower-carboxylic acyl group, and $R^1$ stands for a lower-alkyl group.

When R in the above formula stands for a lower-carboxylic acyl group, it represents an acyl group derived from a carboxylic acid having from one to about ten carbon atoms and a molecular weight less than about 200. Representative of the acyl radicals which are contemplated are lower-alkanoyl radicals, e.g., formyl, acetyl, propionyl, butyryl, isobutyryl, caproyl, heptanoyl, octanoyl, trimethylacetyl, and the like; carboxy-lower-alkanoyl radicals, e.g., succinyl (β-carboxypropionyl); cycloalkyl-lower-alkanoyl radicals, e.g., succinyl (β-carboxypropionyl); cycloalkyl-lower-alkanoyl radicals, e.g., β-cyclopentylpropionyl, β - cyclohexylpropionyl, and the like; monocarbocyclic aroyl radicals, e.g., benzoyl, p - toluyl, p - nitrobenzoyl, 3,4,5 - trimethoxybenzoyl, and the like; monocarbocyclic aryl-lower-alkanoyl or -alkenoyl radicals, such as phenylacetyl, β-phenylpropionyl, cinnamoyl, and the like; and monocarbocyclic aryloxy-lower-alkanoyl radicals, such as p-chlorophenoxyacetyl, and the like.

When $R^1$ in the above formula stands for lower-alkyl, it represents an alkyl group having from one to about four carbon atoms, thus including methyl, ethyl, propyl, isopropyl, butyl, and the like.

The compounds of formula I are prepared by treating a steroid of the following general formula II with hydrazine.

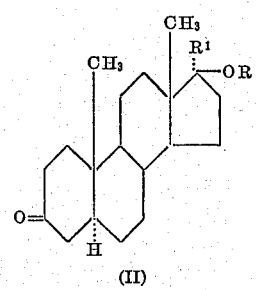

The reaction takes place by warming (50–100° C.) a mixture of the steroid and at least one-half molar equivalent of hydrazine in an inert solvent such as a lower-alkanol.

The structures of the compounds of the invention were established by the mode of synthesis, by elementary analysis and by ultraviolet and infrared spectra.

Endocrinological evaluation of the compounds of the invention has shown that they are useful as endocrinological agents because they possess androgenic and anabolic activities.

The following will further illustrate the invention without the latter being limited thereby.

*17α-methylandrostan-17β-ol-3-one azine*

Hydrazine hydrate (1.26 g.) was added to a solution of 7.00 g. of 17α-methylandrostan-17β-ol-3-one in 100 ml. of methanol. The solution was warmed and concentrated on a steam bath until crystals appeared. The mixture was cooled and the prduct collected by filtration to give 1.94 g., M.P. about 286° C. (uncorr.). Concentration of the mother liquors afforded an additional 4.38 g. of material, M.P. about 282° C. (uncorr.). The combined product was dissolved in 800 ml. of methanol and 100 ml. of chloroform, and the solution was concentrated until crystallization began. The recrystallized material was dissolved in 200 ml. of chloroform, the solution concentrated to a volume of 40 ml., and 40 ml. of methanol was added. The material which separated was collected by filtration and dried for twenty hours at 100° C. to give 17α-methylandrostan-17β-ol-3-one azine, M.D. 287.8–290.8° C. (corr.); $[\alpha]_D^{25} = +17.90$ (1% in chloroform); ultraviolet shoulder at 232 mμ ($\epsilon$=2600); infrared absorption at 2.88, 2.79, 3.45, 6.11, 6.80, 6.90 and 7.00μ.

By replacing the 17α-methylandrostan-17β-ol-3-one in the foregoing preparation by a molar equivalent amount of 17β-acetoxy-17α-methylandrostan-3-one, 17β-propionoxy)-17α - methylandrostan - 3 - one, 17β - (β - carboxypropionoxy) - 17α - methylandrostan-3-one, 17β-(β-cyclopentylpropionoxy) - 17α-methylandrostan-3-one, 17β-benzoyloxy-17α-methylandrostan-3-one, 17β-caproyloxy-17α-methylandrostan - 3 - one, 17β-(p-nitrobenzoyloxy)-17α-methylandrostan-3-one, or 17β-cinnamoyloxy-17α-methylandrostan-3-one, there can be obtained, respectively the 17-acetate, 17-propionate, 17-hemisuccinate, 17-β-cyclopentylpropionate, 17-benzoate, 17-caproate, 17-p-nitrobenzoate or 17-cinnamate of 17α-methylandrostan-17β-ol-3-one azine. The starting esters can be prepared by heating 17α-methylandrostan-17β-ol-3-one with the appropriate acid anhydride or acid halide in pyridine solution for several hours at about 150° C.

I claim:
1. A compound of the formula

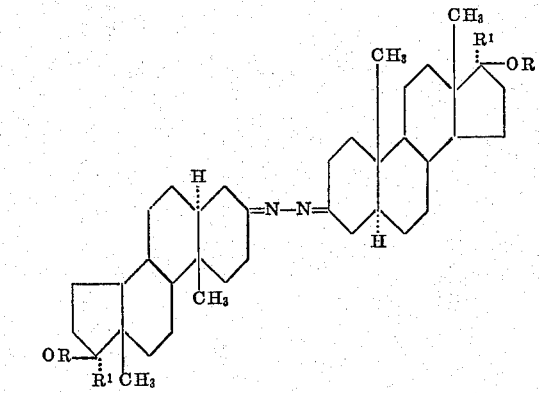

wherein R is a member of the group consisting of hydrogen and lower-carboxylic acyl, and $R^1$ is lower-alkyl.
2. 17α-methylandrostan-17β-ol-3-one azine.

References Cited by the Examiner
UNITED STATES PATENTS
3,062,847   11/62   De Ruggieri ———————— 260—397.5

LEWIS GOTTS, *Primary Examiner.*